United States Patent
Camp et al.

(10) Patent No.: US 9,601,940 B2
(45) Date of Patent: Mar. 21, 2017

(54) BATTERY PACK WITH LOCALLY CONTROLLED DISCONNECT SAFEGUARDS

(71) Applicant: Analog Devices, Inc., Norwood, MA (US)

(72) Inventors: James C. Camp, Greensboro, NC (US); Thomas M. MacLeod, Clemmons, NC (US)

(73) Assignee: Analog Devices, Inc., Norwood, MA (US)

( * ) Notice: Subject to any disclaimer, the term of this patent is extended or adjusted under 35 U.S.C. 154(b) by 106 days.

(21) Appl. No.: 14/452,311

(22) Filed: Aug. 5, 2014

(65) Prior Publication Data

US 2015/0044515 A1 Feb. 12, 2015

Related U.S. Application Data

(60) Provisional application No. 61/862,835, filed on Aug. 6, 2013.

(51) Int. Cl.
*H02J 7/00* (2006.01)
*H01M 10/42* (2006.01)

(52) U.S. Cl.
CPC .......... *H02J 7/007* (2013.01); *H01M 10/425* (2013.01); *H01M 10/4257* (2013.01); *H02J 7/0018* (2013.01); *H02J 7/0019* (2013.01); *H02J 7/0063* (2013.01); *H01M 2010/4271* (2013.01); *H01M 2010/4278* (2013.01); *H01M 2220/20* (2013.01); *H02J 2007/0098* (2013.01)

(58) Field of Classification Search
None
See application file for complete search history.

(56) References Cited

U.S. PATENT DOCUMENTS

| | | | | | |
|---|---|---|---|---|---|
| 4,649,333 | A | * | 3/1987 | Moore | H02J 7/0091 320/112 |
| 5,982,142 | A | * | 11/1999 | Sullivan | H02J 7/0018 320/118 |

(Continued)

FOREIGN PATENT DOCUMENTS

| | | |
|---|---|---|
| JP | 2009-278709 A | 11/2009 |
| JP | 2013-102657 A | 5/2013 |

(Continued)

OTHER PUBLICATIONS

Brown (Dallas Personal Robotics Group, tutorial) (Sep. 2002).*
"U.S. Appl. No. 14/452,272, Non Final Office Action mailed Mar. 10, 2016", 16 pgs.

(Continued)

*Primary Examiner* — Miriam Stagg
*Assistant Examiner* — Wojciech Haske
(74) *Attorney, Agent, or Firm* — Schwegman Lundberg & Woessner, P.A.

(57) ABSTRACT

Embodiments of the present invention are directed to an improved battery packaging design. The battery pack design may include a battery cell, a plurality of transistors, and a controller. The transistors may be coupled to the terminals of the battery cell in an H-bridge configuration. The controller may control the transistors to bypass the battery cell based on the current flowing between the output terminals of the battery pack. In such a manner, the controller may prevent damage to the battery cell and improve the overall safety of the battery pack in hazardous conditions.

32 Claims, 8 Drawing Sheets

(56) References Cited

U.S. PATENT DOCUMENTS

| | | | |
|---|---|---|---|
| 7,378,818 B2 | 5/2008 | Fowler et al. | |
| 7,583,057 B2 | 9/2009 | Morita | |
| 7,612,530 B2 | 11/2009 | Konishi et al. | |
| 8,330,420 B2 | 12/2012 | Kim et al. | |
| 9,261,568 B2 | 2/2016 | Parle et al. | |
| 2003/0232237 A1 | 12/2003 | Nakagawa et al. | |
| 2006/0087283 A1* | 4/2006 | Phillips | B25F 5/00 320/114 |
| 2007/0182377 A1 | 8/2007 | Vandensande | |
| 2008/0180059 A1 | 7/2008 | Carrier et al. | |
| 2008/0252257 A1 | 10/2008 | Sufrin-Disler et al. | |
| 2009/0091332 A1 | 4/2009 | Emori et al. | |
| 2009/0284022 A1* | 11/2009 | Usselman | F02D 29/06 290/38 R |
| 2011/0140663 A1 | 6/2011 | Tofigh et al. | |
| 2013/0108898 A1 | 5/2013 | Potts et al. | |
| 2013/0162045 A1* | 6/2013 | Weissenborn | H02J 7/0024 307/71 |
| 2013/0200849 A1* | 8/2013 | Crebier | H01M 10/441 320/116 |
| 2014/0015488 A1 | 1/2014 | Despesse | |
| 2014/0197795 A1 | 7/2014 | Crebier et al. | |
| 2015/0042283 A1 | 2/2015 | Camp et al. | |
| 2015/0044521 A1 | 2/2015 | Camp et al. | |
| 2015/0044522 A1 | 2/2015 | Camp et al. | |

FOREIGN PATENT DOCUMENTS

| | | |
|---|---|---|
| JP | 2013-520151 A | 5/2013 |
| WO | WO-2015021167 | 2/2015 |

OTHER PUBLICATIONS

International Search Report and Written Opinion of the International Searching Authority for corresponding International application No. PCT/US2014/049958, communication dated Nov. 19, 2014.

Intersil, "Designing Multi-Cell Li-ion Battery Packs Using the ISL9208 Analog Front End", Application Note AN1333.0, Jul. 17, 2007, 25 pages.

"U.S. Appl. No. 14/452,272, Examiner Interview Summary mailed Jun. 17, 2016", 3 pgs.

"U.S. Appl. No. 14/452,272, Examiner Interview Summary mailed Jul. 15, 2016", 3 pgs.

"U.S. Appl. No. 14/452,272, Response filed Jun. 10, 2016 to Non Final Office Action mailed Mar. 10, 2016", 13 pgs.

"U.S. Appl. No. 14/452,272, Summary of Jul. 7, 2016 Examiner Interview filed Jul. 21, 2016", 1 pg.

Corzine, Keith A., et al., "Control of Cascaded Multilevel Inverters", IEEE Transactions on Power Electronics, 19(3), (May 2004), 732-738.

Rodríguez, Joes, et al., "Multilevel Inverters: A Survey of Topologies, Controls, and Applications", IEEE Transactions on Industrial Electronics, 49(4), (Aug. 2002).

Senesky, Matthew, et al., "Battery Module Balancing with a Cascaded H-Bridge Multilevel Inverter", White Paper, Altair Nanotechnologies Inc., (Jan. 31, 2012), 1-4.

"U.S. Appl. No. 14/452,163, Non Final Office Action mailed Oct. 31, 2016", 5 pgs.

"U.S. Appl. No. 14/452,272, Notice of Allowance mailed Dec. 12, 2016", 5 pgs.

"U.S. Appl. No. 14/452,357, Non Final Office Action mailed Dec. 1, 2016", 10 pgs.

* cited by examiner

100

500

600

700

800

_(56)_

BATTERY PACK WITH LOCALLY CONTROLLED DISCONNECT SAFEGUARDS

RELATED APPLICATIONS

This application claims priority to U.S. Patent Application Ser. No. 61/862,835 filed on Aug. 6, 2013, the content of which is incorporated herein in its entirety.

BACKGROUND

The present invention relates to battery stack control systems.

Battery stacks include a plurality of individual "cells" are arranged in series in order to build a battery stack having a desired output voltage. A large number of cells may be arranged in series such that, for example, the total potential difference developed across the battery stack is in the order of a several hundred volts. Each cell typically only has a potential difference of a few volts (e.g., 3 volts) developed across it. Battery stacks also include a switch control, which can be used to switch cells individually in and out of the stack and control the orientation of the cells (e.g., positive or negative orientation) within the stack to meet timing requirements. Battery stacks can be used to generate time-varying outputs (e.g., sinusoidal signals) about a ground value (e.g., +300 volts to −300 volts in a 100 cell stack).

Rechargeable battery stacks can be used in many applications. One such application is the use of batteries in hybrid or fully electric vehicles. Hybrid and fully electric vehicles (HEV/EVs) are becoming increasingly popular, therefore there is a need for more effective, efficient, and safe battery stack systems. Conventional battery stacks suffer from several problems during operation. For example, because each of the cells in a battery stack discharges at a different rate, some cells may become too weak to supply voltage to a load. In such a case, the weakened cell can be permanently damaged if it is forced to discharge further and will eventually need to be replaced. Similar problems occur when a fully charged cell is over-charged. Additionally, if a cell is damaged beyond repair, the stack needs to continue to operate as required by the load. Conventional battery stacks fail to adequately account for such errors. Finally, when battery stacks are exposed to hazardous conditions (e.g., when they are submersed in water), they can become flammable, causing serious safety issues. This problem is specifically dangerous because there is a reasonable likelihood that consumers will be in close proximity to battery cells.

Thus, there is a need for improved battery stack monitoring systems to account for the problems described above.

DETAILED DESCRIPTION

Embodiments of the present disclosure are directed to improved battery cells and battery stack controller systems. A first embodiment is directed to a battery controller system. The control system may include a controller, sensors, transmitters, and receivers. The receivers may receive charge/discharge commands over a communication network. The controller may determine the state or condition of the cell (e.g., whether the cell is weak, strong, depleted, charged, etc.) using the sensor. Subsequently, the controller may determine whether the cell can fulfill the command or whether the command should be passed to a neighboring battery cell in a battery stack via the transmitters.

Another embodiment is directed to a battery stack controller system. The system may include a plurality of battery cell stages with cell controller systems (as described above with respect to the first embodiment). The system may also include a stack controller to send charge/discharge commands to the battery stack via a communication network. The stack controller may send the commands to the battery stack based on the requirements of a load or the state of the battery cell stages. The battery cell stages may either comply with the commands or send the commands to neighboring cells via the communication network.

A further embodiment is directed to an improved battery packaging design. The battery pack design may include a battery cell, a plurality of transistors, and a controller. The transistors may be coupled to the terminals of the battery cell in an H-bridge configuration. The controller may control the transistors to bypass the battery cell based on the current flowing between the output terminals of the battery pack. In such a manner, the controller may prevent damage to the battery cell and improve the overall safety of the battery pack in hazardous conditions.

Yet another embodiment is directed to a battery stack with a leapfrogging communication network. Each cell stage may include a controller, a transmitter, and a pair of receivers. The cell stage in the battery stack may be coupled to the closest two preceding battery cell stages in the stack. In this manner, each cell stage may be able to determine if a fault is present in an immediately preceding cell stage in the stack by monitoring the first preceding cell stage and the second preceding cell stage. If discharge/charge commands transmitted by the second preceding cell stage are not reaching the battery cell stage at issue, the controller may determine that there is a fault in the first preceding cell stage and discharge/charge the cell stage based on the commands transmitted by the second preceding cell stage.

Figure 1:
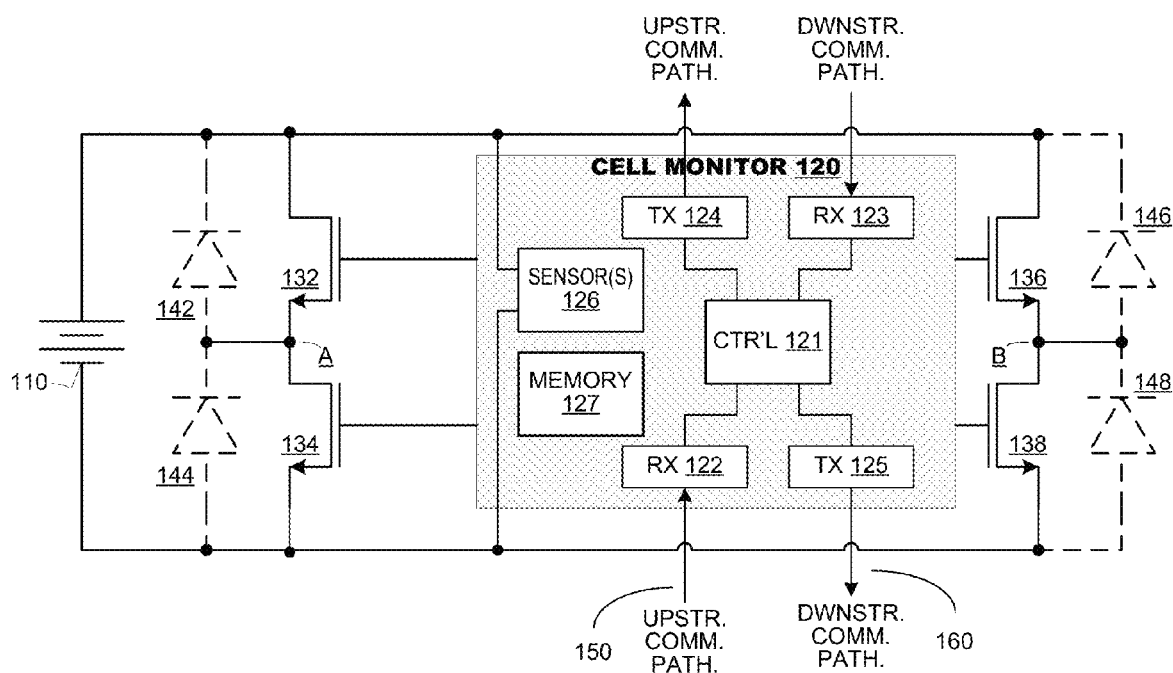
FIG. 1 is a diagram of a single battery cell stage according to an embodiment of the present disclosure.
Figure 3:
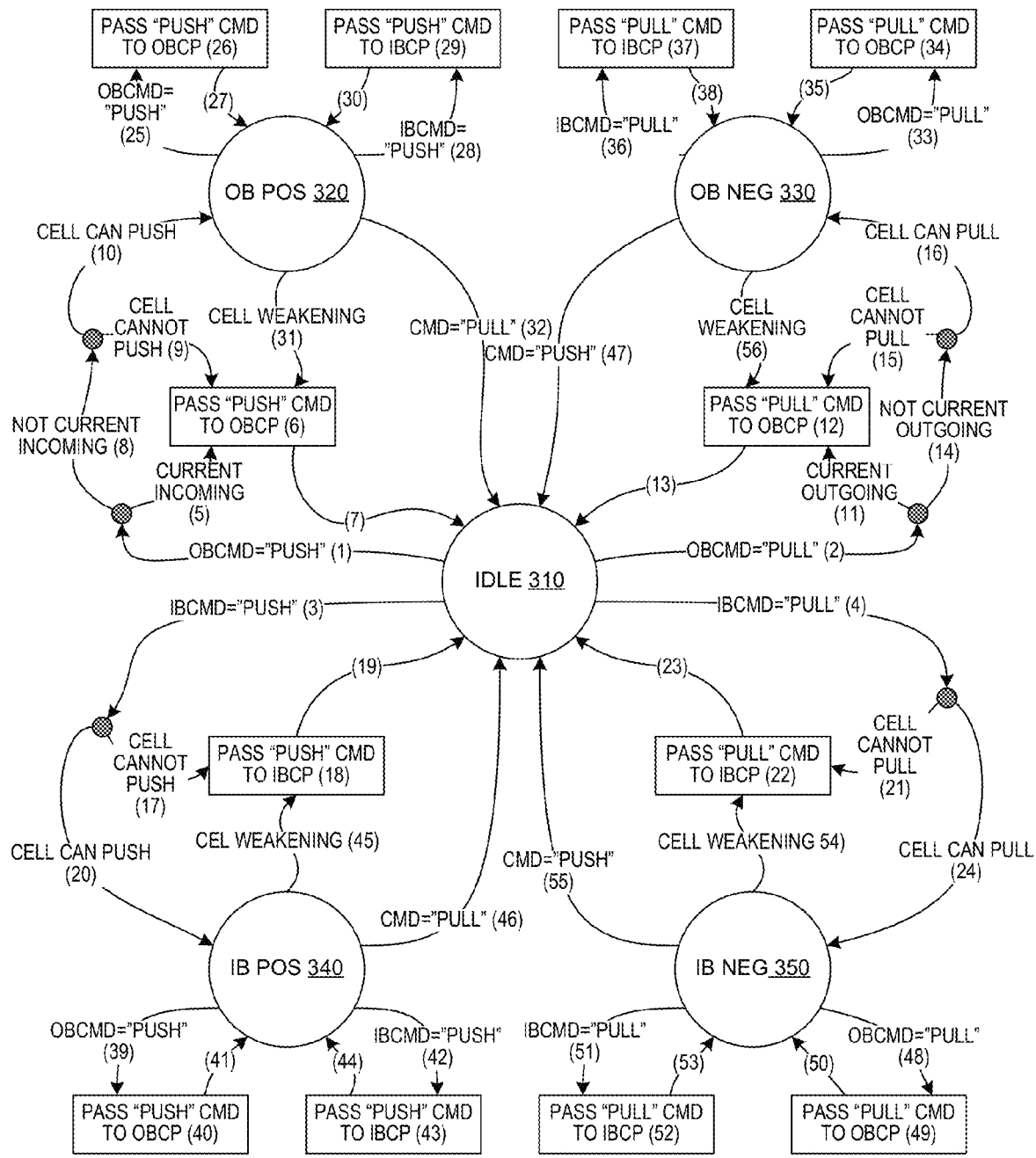
FIG. 3 is a state diagram of a local decision making process for each battery cell stage in a battery stack that is discharging according to an embodiment of the present disclosure.

FIG. 1 illustrates a cell stage 100 according to an embodiment of the present disclosure. The cell stage 100 may be one stage in a multi-stage battery stack system (as shown in FIG. 3 below). As illustrated in FIG. 1, the battery cell stage 100 may include a battery cell 110, a cell monitor 120 coupled to respective ends of the battery cell 110, and switches 132, 134, 136, and 138. The battery cell stage 100 may communicate with neighboring battery cell stages (not shown) in a battery stack via the upstream communication path 150 and the downstream communication path 160.

The battery cell 110 may be a lead-acid, nickel-metal hydride (NiMH), lithium-ion (Li-ion), or other type of battery that may be integrated in a battery stack, including a plurality of battery cells, to provide power to drive a load (e.g., a motor).

The cell monitor 120 may include a controller 121, receivers 122 and 123, transmitters 124 and 125, sensor(s) 126, and a memory 127. The cell monitor 120 may make local decisions and switch-in or bypass the associated battery cell 110 based on communications received on the upstream and downstream communication paths 150 and 160 and the local state of the battery cell 110.

The controller 121 may include a microcontroller, a programmable processor, and/or a state machine. The controller 121 may make the local decisions and switch-in/bypass the battery cell 110 based on the condition of the battery cell 110. The receivers 122, 123 and transmitters 124, 125 may be controlled by the controller 121 and may receive and transmit information via paths 150 and 160. In the upstream (or outbound) communication path 150, the receiver 122 may receive a PUSH/PULL command (described in more detail below) from a previous stage in the stack and transmitter 124 may transmit a PUSH/PULL command to a next stage in the stack. In the downstream (or inbound) communication path, receiver 123 may receive a PUSH/PULL command from a previous battery stage in the stack and transmitter 125 may transmit a PUSH/PULL command to the next battery stage in the stack.

The sensor(s) 126 may determine a direction of current flow through the battery cell 110, for example, whether current is flowing upwardly or downwardly through a stack in which the cell 110 is a member. The sensor(s) 126 may also measure operating parameters of the battery cell 110, for example, charge level, health, temperature, fault status, or other conditions. The memory 127 may store data such as measurements taken by the sensor(s) 126. The memory may also store logs of PUSH/PULL commands received by the receivers 122 and 123. The data stored in the memory 127 may be accessed by the controller 121.

The switches 132, 134, 136, and 138 may facilitate switching-in/bypassing of the battery cell 110 in the stack. The switches 132, 134, and 138 may be controlled by cell control controller 121. The switches 132-138 may be arranged in an H-bridge configuration about the cell monitor 120 as shown in FIG. 1 and switched in pairs. The switches 132-138 may be metal-oxide-semiconductor field-effect transistors (MOSFETs) of sufficient size to serve as power transistors or mechanical switches.

During operation, the battery cell stage 100 of FIG. 1 may receive and transmit PUSH and PULL commands from adjacent cells in a battery stack via the upstream and downstream communication paths. A PUSH command may represent a command by an external controller to add positive voltage to an output of the stack in which the stage 100 belongs. The stage 100 may respond to a push command in a variety of ways, depending on operating conditions at the stage 100. For example, if the stage 100 is configured with the battery cell 110 already pushing, it may continue to push and pass the PUSH command to another cell stage in the stack. If the system 100 is configured with the battery cell 110 pulling, it may cease pulling and may consume the PUSH command. The system 100 may determine that the battery cell 110 is in no condition to push, even though it is idle, and may pass the PUSH command to a next cell in the stack. These processes are described hereinbelow.

A PULL command may represent a command by an external control to add negative voltage to a load device by a stack in which the cell stage 100 belongs. The stage 100 may respond to a PULL command in a variety of ways, depending on operating conditions at the stage 100. For example, if the stage 100 is configured with the battery cell 110 already pulling, it may continue to pull and pass the PULL command to another stage in the stack. If the stage 100 is configured with the battery cell 110 pushing, it may cease pushing and may consume the PULL command. The system 100 may determine that the battery cell 110 is in no condition to pull, even though it is idle, and may pass the PULL command to a next cell in the stack. These processes are described hereinbelow.

Although the system 100 may operate in various states (see FIGS. 2-4 and the corresponding description of the figures below), the system may have the following two basic configurations: (1) a "switched-in" configuration and (2) a "bypassed" or "idle" configuration. During a switched-in configuration, the cell monitor 120 may control the switches 132-138 to connect the cell 110 to the battery stack at nodes A and B. While the cell 110 is switched into the stack, the cell 110 may either discharge or charge based on the needs of the stage 100 and the load. If switches 132 and 138 are on and switches 134 and 134 are off, the cell may discharge a positive voltage. If switches 134 and 136 are on and switches 132 and 138 are off, the cell may discharge a negative voltage.

During a bypassed configuration, the cell monitor 120 may control the switches 132-138 to disconnect the cell 110 from the battery stack at nodes A and B. While the cell 110 is bypassed from the stack, the cell 110 may be prevented from being charged or discharged while the remaining stages in the stack are being charged or discharged. This may prevent the cell 110 from being damaged by being over discharged/charged. Based on the structure and operation of system 100 above, the cell monitor 120 may balance the cell's 110 charge/discharge operations and prevent the cell from being damaged from over discharging and overcharging.

Figure 2:
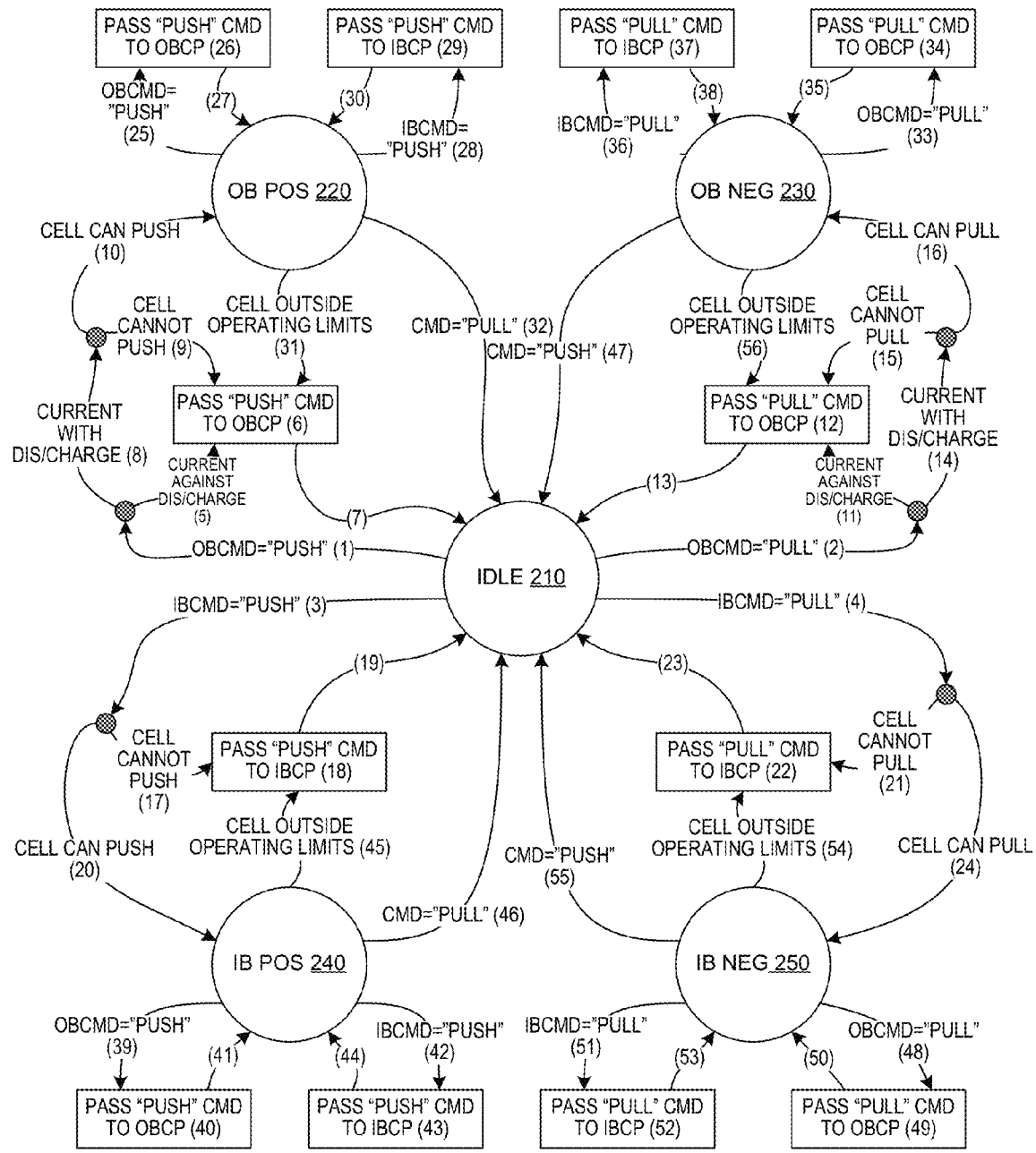
FIG. 2 is a state diagram of a local decision making process for each battery cell stage in a battery stack according to an embodiment of the present disclosure.

The cell stage 100 optionally may include diodes 142, 144, 146, and 148 coupled to the terminals of corresponding switches 132, 134, 136, and 138. The diodes 142, 144, 146, and 148 may provide charge and discharge fly-back protection for the switches 132, 134, 136, and 138, respectively FIG. 2 is a state diagram illustrating control operations of a cell stage 100 that is either charging or discharging according to an embodiment of the present invention. The state diagram illustrates a response of a cell monitor 120 when it receives PUSH/PULL commands from adjacent cells in a battery stack. As illustrated in FIG. 2(A), the cell monitor 120 may make switch-in/bypass configuration decisions in response to PUSH/PULL commands received via the out-bound (or upstream) or in-bound (or downstream) communication pathways 150 and 160, respectively, according to the processes outlined below. Each arrow in FIG. 2(A) is designated by a number (1)-(56) for convenience.

FIG. 2(A) illustrates an idle state 210, representing a bypassed configuration of the stage 100. When in the idle state, the stage 100 may response to received commands in a variety of ways. For example, if the controller 121 of the cell monitor 120 receives a PUSH command on the out-bound communication pathway 150 (OBCMD="PUSH" (1)), the controller 121 may determine a direction of current flow through the stack. If the battery stack is either charging or discharging and the current flowing through the stage 100 is flowing against the direction of the charge or discharge (5), the cell controller 121 may pass the PUSH command further up the out-bound communication pathway 150 (6) and return to the idle state 210 (7). If the battery stack is either charging or discharging and the current flowing through the stage 100 is flowing with the direction of the charge or discharge (8), the cell controller 121 may determine whether the cell 110 is in a condition to push (i.e., either charge or discharge). If the cell 110 cannot push (i.e., charge or discharge) (9), the cell controller 121 may pass the PUSH command further up the OBCP 150 (6) and return to the idle state 210 (7). If the cell 110 can push (i.e., charge or discharge) (10), the cell controller 121 may control the switches 132-138 to switch the cell 110 into the stack in a positive orientation. The stage 100 may then enter the out-bound positive orientation (OB POS) state 220 and either charge or discharge the cell 110.

When in the idle state 210, if the controller 121 of the cell monitor 120 receives a PULL command on the out-bound communication pathway 150 (OBCMD="PULL" (2)), the controller 121 may determine a direction of current flow through the stack. If the battery stack is either charging or discharging and the current flowing through the stage 100 is flowing against the direction of the charge or discharge (11), the cell controller 121 may pass the PULL command further up the out-bound communication pathway 150 (12) and return to the idle state 210 (13). If the battery stack is either charging or discharging and the current flowing through the system 100 is flowing with the direction of the charge or discharge (14), the cell controller 121 may determine whether the cell 110 is in a condition to pull (i.e. charge or discharge). If the cell 110 cannot pull (i.e., charge or discharge) (15), the cell controller 121 may pass the PULL command further up the OBCP and return to the idle state 210 (13). If the cell 110 can pull (i.e., charge or discharge) (16), the cell controller 121 may control the switches 132-138 to switch the cell 110 into the stack in a negative orientation. The stage 100 may then enter the out-bound negative orientation (OB NEG) state 230 and either charge or discharge the cell 110.

When in the idle state 210, if the controller 121 of the cell monitor 120 receives a PUSH command on the in-bound communication pathway 160 (IBCMD="PUSH" (3)), the controller 121 may determine the condition of the battery cell 110. If the cell 110 cannot push (i.e., charge or discharge) (17), the cell controller 121 may pass the PUSH command further down the IBCP 160 (18) and return to the idle state 210 (19). If the cell 110 can push (i.e., charge or discharge) (20), the cell controller 121 may control the switches 132-138 to switch the cell 110 into the stack in a positive orientation and enter the in-bound positive orientation (IB POS) state 240 to either charge or discharge the cell 110.

While in the idle state 210, if the controller 121 of the cell monitor 120 receives a PULL command on the in-bound communication pathway 160 (IBCMD="PULL" (4)), the controller 121 may determine the condition of the battery cell 110. If the cell 110 cannot pull (i.e., charge or discharge) (21), the cell controller 121 may pass the PULL command further down the IBCP (22) and return to the idle state 210 (23). If the cell 110 can pull (i.e., charge or discharge) (24), the cell controller 121 may control the switches 132-138 to switch the cell 110 into the stack in a negative orientation and enter the in-bound negative orientation (IB NEG) state 250 to either charge or discharge the cell 110.

When the stage 100 is in the OB POS state 220, the stage 100 may respond to received commands in a variety of ways. For example, if the controller 121 receives a PUSH command on the out-bound communication pathway 150 (i.e., OBCMD="PUSH" (25)), the controller 121 may pass the PUSH command further up the OBCP 150 (26) and return to the OB POS 220 state (27). If, the controller 121 receives a PUSH command on the in-bound communication pathway 160 (i.e., IBCMD="PUSH" (28)), the controller 121 may pass the PUSH command further down the IBCP 160 (29) and return to the OB POS 220 state (30). If the controller 121 receives, on either the IBCP 160 or OBCP 150, a PULL command (32), the controller 121 may revert back to the idle state 210. In the absence of a command, if the controller 121 determines that operating conditions have taken the cell 110 outside its operating limits (e.g., either too weak to discharge or too full to charge) (31), the cell controller 121 may pass a locally generated PUSH command further up the OBCP 150 (6) and revert back to the idle state 210 (7).

When the stage 100 is in the OB NEG state 230, the stage 100 may respond to received commands in a variety of ways. For example, if the controller 121 receives a PULL command on the out-bound communication pathway 150 (i.e., OBCMD="PULL" (33)), the controller 121 may pass the PULL command further up the OBCP (34) and return to the OB NEG 230 state (35). If the controller 121 receives a PULL command on the in-bound communication pathway 160 (i.e., IBCMD="PULL" (36)), the controller 121 may pass the PULL command further down the IBCP 160 (37) and return to the OB NEG 230 state (38). If the controller 121 receives, on either the IBCP 160 or OBCP 150, a PUSH command (47), the controller 121 may revert back to the idle state 210. In the absence of a command, if the controller 121 determines that operating conditions have taken the cell 110 outside its operating limits (e.g., either too weak to discharge or too full to charge) (56), the cell controller 121 may pass a locally generated PULL command further up the OBCP 150 (12) and revert back to the idle state 210 (13).

When the stage 100 is in the IB POS state 240, the stage 100 may respond to received commands in a variety of ways. For example, if the controller 121 receives a PUSH command on the out-bound communication pathway 150 (i.e., OBCMD="PUSH" (39)), the controller 121 may pass the PUSH command further up the OBCP (40) and remain in the IB POS 240 state (41). If the controller 121 receives a PUSH command on the in-bound communication pathway 160 (i.e., IBCMD="PUSH" (42)), the controller 121 may pass the PUSH command further down the IBCP 160 (43) and remain in the IB POS 240 state (44). If the controller 121 receives, on either the IBCP 160 or OBCP 150, a PULL command (46), the controller 121 may revert back to the idle state 210. In the absence of a command, if the controller 121 determines that operating conditions have taken the cell 110 outside its operating limits (e.g., either too weak to discharge or too full to charge) (45), the cell controller 121 may pass a locally generated PUSH command further down the IBCP 160 (18) and revert back to the idle state 210 (19).

When the stage 100 is in the IB NEG state 250, the stage 100 may respond to received commands in a variety of ways. For example, if the controller 121 receives a PULL command on the out-bound communication pathway 150 (i.e., OBCMD="PULL" (48)), the controller 121 may pass the PULL command further up the OBCP 150 (49) and return to the IB NEG 250 state (50). If the controller 121 receives a PULL command on the in-bound communication pathway 160 (i.e., IBCMD="PULL" (51)), the controller 121 may pass the PULL command further down the IBCP 160 (52) and remain in the IB NEG 250 state (53). If the controller 121 receives, on either the IBCP 160 or OBCP 150, a PUSH command (55), the controller 121 may revert back to the idle state 210. In the absence of a command, if the controller 121 determines that operating conditions have taken the cell 110 outside its operating limits (e.g., either too weak to discharge or too full to charge) (54), the cell controller 121 may pass a locally generated PULL command further down the IBCP 160 (22) and revert back to the idle state 210 (23).

FIG. 3 is a state diagram illustrating control operations of a cell stage 100 that is discharging according to an embodiment of the present invention. The state diagram illustrates a response of a cell monitor 120 when it receives PUSH/PULL commands from adjacent cells in a battery stack. As illustrated in FIG. 3, the cell monitor 120 may make switch-in/bypass configuration decisions in response to PUSH/PULL commands received via the out-bound (or upstream) or in-bound (or downstream) communication pathways 150 and 160, respectively, according to the processes outlined below. Each arrow in FIG. 3 is designated by a number (1)-(56) for convenience.

FIG. 3 illustrates an idle state 310, representing a bypassed configuration of the stage 100. When in the idle state, the stage 100 may response to received commands in a variety of ways. For example, if the controller 121 of the cell monitor 120 receives a PUSH command on the out-bound communication pathway 150 (OBCMD="PUSH" (1)), the controller 121 may determine a direction of current flow through the stack. If the battery stack is discharging and the current flowing through the stage 100 is incoming (5), the cell controller 121 may pass the PUSH command further up the out-bound communication pathway 150 (6) and return to the idle state 310 (7). If the battery stack is discharging and the current flowing through the stage 100 is not incoming (8), the cell controller 121 may determine whether the cell 110 is in a condition to push (i.e., discharge). If the cell 110 cannot push (i.e., discharge) (9), the cell controller 121 may pass the PUSH command further up the OBCP 150 (6) and return to the idle state 310 (7). If the cell 110 can push (i.e., discharge) (10), the cell controller 121 may control the switches 132-138 to switch the cell 110 into the stack in a positive orientation. The stage 100 may then enter the out-bound positive orientation (OB POS) state 320 and discharge the cell 110.

When in the idle state 310, if the controller 121 of the cell monitor 120 receives a PULL command on the out-bound communication pathway 150 (OBCMD="PULL" (2)), the controller 121 may determine a direction of current flow through the stack. If the battery stack is discharging and the current flowing through the stage 100 is outgoing (11), the cell controller 121 may pass the PULL command further up the out-bound communication pathway 150 (12) and return to the idle state 310 (13). If the battery stack is discharging and the current flowing through the system 100 is not outgoing (14), the cell controller 121 may determine whether the cell 110 is in a condition to pull (i.e. discharge). If the cell 110 cannot pull (i.e., discharge) (15), the cell controller 121 may pass the PULL command further up the OBCP and return to the idle state 310 (13). If the cell 110 can pull (i.e., discharge) (16), the cell controller 121 may control the switches 132-138 to switch the cell 110 into the stack in a positive orientation. The stage 100 may then enter the out-bound negative orientation (OB NEG) state 330 and discharge the cell 110.

When in the idle state 310, if the controller 121 of the cell monitor 120 receives a PUSH command on the in-bound communication pathway 160 (IBCMD="PUSH" (3)), the controller 121 may determine the condition of the battery cell 110. If the cell 110 cannot push (i.e., discharge) (17), the cell controller 121 may pass the PUSH command further down the IBCP 160 (18) and return to the idle state 310 (19). If the cell 110 can push (i.e., discharge) (20), the cell controller 121 may control the switches 132-138 to switch the cell 110 into the stack in a positive orientation and enter the in-bound positive orientation (IB POS) state 340 to discharge the cell 110.

While in the idle state 310, if the controller 121 of the cell monitor 120 receives a PULL command on the in-bound communication pathway 160 (IBCMD="PULL" (4)), the controller 121 may determine the condition of the battery cell 110. If the cell 110 cannot pull (i.e., discharge) (21), the cell controller 121 may pass the PULL command further down the IBCP 160 (22) and return to the idle state 310 (23). If the cell 110 can pull (i.e., discharge) (24), the cell controller 121 may control the switches 132-138 to switch the cell 110 into the stack in a negative orientation and enter the in-bound negative orientation (IB NEG) state 350 to discharge the cell 110.

When the stage 100 is in the OB POS state 320, the stage 100 may respond to received commands in a variety of ways. For example, if the controller 121 receives a PUSH command on the out-bound communication pathway 150 (i.e., OBCMD="PUSH" (25)), the controller 121 may pass the PUSH command further up the OBCP 150 (26) and return to the OB POS 320 state (27). If, the controller 121 receives a PUSH command on the in-bound communication pathway 160 (i.e., IBCMD="PUSH" (28)), the controller 121 may pass the PUSH command further down the IBCP 160 (29) and return to the OB POS 320 state (30). If the controller 121 receives, on either the IBCP 160 or OBCP 150, a PULL command (32), the controller 121 may revert back to the idle state 310. In the absence of a command, if the controller 121 determines that the cell 110 is weakening (i.e., weakening below a predetermined limit so it can no longer discharge) (31), the cell controller 121 may pass a locally generated PUSH command further up the OBCP 150 (6) and revert back to the idle state 310 (7).

When the stage 100 is in the OB NEG state 330, the stage 100 may respond to received commands in a variety of ways. For example, if the controller 121 receives a PULL command on the out-bound communication pathway 150 (i.e., OBCMD="PULL" (33)), the controller 121 may pass the PULL command further up the OBCP 150 (34) and return to the OB NEG 330 state (35). If the controller 121 receives a PULL command on the in-bound communication pathway 160 (i.e., IBCMD="PULL" (36)), the controller 121 may pass the PULL command further down the IBCP 160 (37) and return to the OB NEG 330 state (38). If the controller 121 receives, on either the IBCP 160 or OBCP 150, a PUSH command (47), the controller 121 may revert back to the idle state 310. In the absence of a command, if the controller 121 determines that the cell 110 is weakening (i.e., weakening below a predetermined limit so it can no longer discharge) (56), the cell controller 121 may pass a locally generated PULL command further up the OBCP 150 (12) and revert back to the idle state 310 (13).

When the stage 100 is in the IB POS state 340, the stage 100 may respond to received commands in a variety of ways. For example, if the controller 121 receives a PUSH command on the out-bound communication pathway 150 (i.e., OBCMD="PUSH" (39)), the controller 121 may pass the PUSH command further up the OBCP 150 (40) and remain in the IB POS 340 state (41). If the controller 121 receives a PUSH command on the in-bound communication pathway 160 (i.e., IBCMD="PUSH" (42)), the controller 121 may pass the PUSH command further down the IBCP 160 (43) and remain in the IB POS 340 state (44). If the controller 121 receives, on either the IBCP 160 or OBCP 150, a PULL command (46), the controller 121 may revert back to the idle state 310. In the absence of a command if the controller 121 determines that the cell 110 is weakening (i.e., weakening below a predetermined limit so it can no longer discharge) (45), the cell controller 121 may pass a locally generated PUSH command further down the IBCP 160 (18) and revert back to the idle state 310 (19).

When the stage 100 is in the IB NEG state 350, the stage 100 may respond to received commands in a variety of ways. For example, if the controller 121 receives a PULL command on the out-bound communication pathway 150 (i.e., OBCMD="PULL" (48)), the controller 121 may pass the PULL command further up the OBCP 150 (49) and return to the IB NEG 350 state (50). If the controller 121 receives a PULL command on the in-bound communication pathway 160 (i.e., IBCMD="PULL" (51)), the controller 121 may pass the PULL command further down the IBCP 160 (52) and remain in the IB NEG 350 state (53). If the controller 121 receives, on either the IBCP 160 or OBCP 150, a PUSH command (55), the controller 121 may revert back to the idle state 310. In the absence of a command, if the controller 121 determines that the cell 110 is weakening (i.e., weakening below a predetermined limit so it can no longer discharge) (54), the cell controller 121 may pass a locally generated PULL command further down the IBCP 160 (22) and revert back to the idle state 310 (23).

Figure 4:
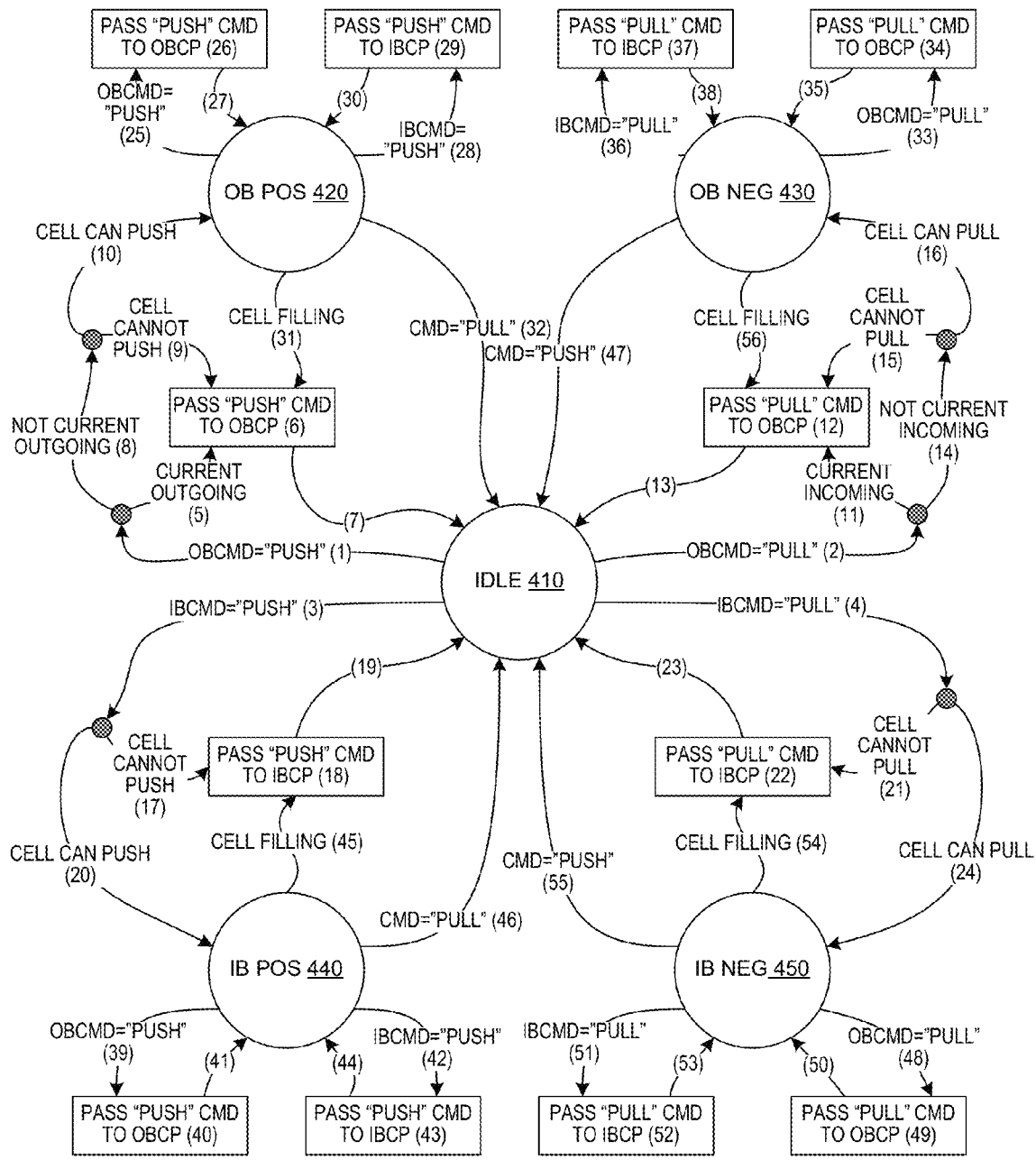
FIG. 4 is a state diagram of a local decision making process for each battery cell stage in a battery stack that is charging according to an embodiment of the present disclosure.

FIG. 4 is a state diagram illustrating control operations of a cell stage 100 that is charging according to an embodiment of the present invention. The state diagram illustrates a response of a cell monitor 120 when it receives PUSH/PULL commands from adjacent cells in a battery stack. As illustrated in FIG. 4, the cell monitor 120 may make switch-in/bypass configuration decisions in response to PUSH/PULL commands received via the out-bound (or upstream) or in-bound (or downstream) communication pathways 150 and 160, respectively, according to the processes outlined below. Each arrow in FIG. 4 is designated by a number (1)-(56) for convenience.

FIG. 4 illustrates an idle state 410, representing a bypassed configuration of the stage 100. When in the idle state, the stage 100 may response to received commands in a variety of ways. For example, if the controller 121 of the cell monitor 120 receives a PUSH command on the out-bound communication pathway 150 (OBCMD="PUSH" (1)), the controller 121 may determine a direction of current flow through the stack. If the battery stack is charging and the current flowing through the stage 100 is outgoing (5), the cell controller 121 may pass the PUSH command further up the out-bound communication pathway 150 (6) and return to the idle state 410 (7). If the battery stack is charging and the current flowing through the stage 100 is not outgoing (8), the cell controller 121 may determine whether the cell 110 is in a condition to push (i.e., charge). If the cell 110 cannot push (i.e., charge) (9), the cell controller 121 may pass the PUSH command further up the OBCP 150 (6) and return to the idle state 410 (7). If the cell 110 can push (i.e., charge) (10), the cell controller 121 may control the switches 132-138 to switch the cell 110 into the stack in a positive orientation. The stage 100 may then enter the out-bound positive orientation (OB POS) state 420 and charge the cell 110.

When in the idle state 410, if the controller 121 of the cell monitor 120 receives a PULL command on the out-bound communication pathway 150 (OBCMD="PULL" (2)), the controller 121 may determine a direction of current flow through the stack. If the battery stack is charging and the current flowing through the stage 100 is incoming (11), the cell controller 121 may pass the PULL command further up the out-bound communication pathway 150 (12) and return to the idle state 410 (13). If the battery stack is charging and the current flowing through the system 100 is not incoming (14), the cell controller 121 may determine whether the cell 110 is in a condition to pull (i.e. charge). If the cell 110 cannot pull (i.e., charge) (15), the cell controller 121 may pass the PULL command further up the OBCP 150 and return to the idle state 410 (13). If the cell 110 can pull (i.e., charge) (16), the cell controller 121 may control the switches 132-138 to switch the cell 110 into the stack in a positive orientation. The stage 100 may then enter the out-bound negative orientation (OB NEG) state 430 and charge the cell 110.

When in the idle state 410, if the controller 121 of the cell monitor 120 receives a PUSH command on the in-bound communication pathway 160 (IBCMD="PUSH" (3)), the controller 121 may determine the condition of the battery cell 110. If the cell 110 cannot push (i.e., charge or discharge) (17), the cell controller 121 may pass the PUSH command further down the IBCP 160 (18) and return to the idle state 410 (19). If the cell 110 can push (i.e., charge or discharge) (20), the cell controller 121 may control the switches 132-138 to switch the cell 110 into the stack in a positive orientation and enter the in-bound positive orientation (IB POS) state 440 to charge the cell 110.

While in the idle state 410, if the controller 121 of the cell monitor 120 receives a PULL command on the in-bound communication pathway 160 (IBCMD="PULL" (4)), the controller 121 may determine the condition of the battery cell 110. If the cell 110 cannot pull (i.e., charge or discharge) (21), the cell controller 121 may pass the PULL command further down the IBCP 160 (22) and return to the idle state 410 (23). If the cell 110 can pull (i.e., charge or discharge) (24), the cell controller 121 may control the switches 132-138 to switch the cell 110 into the stack in a negative orientation and enter the in-bound negative orientation (IB NEG) state 450 to charge the cell 110.

When the stage 100 is in the OB POS state 420, the stage 100 may respond to received commands in a variety of ways. For example, if the controller 121 receives a PUSH command on the out-bound communication pathway 150 (i.e., OBCMD="PUSH" (25)), the controller 121 may pass the PUSH command further up the OBCP 150 (26) and return to the OB POS 420 state (27). If, the controller 121 receives a PUSH command on the in-bound communication pathway 160 (i.e., IBCMD="PUSH" (28)), the controller 121 may pass the PUSH command further down the IBCP 160 (29) and return to the OB POS 420 state (30). If the controller 121 receives, on either the IBCP 160 or OBCP 150, a PULL command (32), the controller 121 may revert back to the idle state 410. In the absence of a command, if the controller 121 determines that the cell 110 is filling (i.e., the cell 110 should not be charged above a predetermined limit to prevent damage to the cell 110) (31), the cell controller 121 may pass a locally generated PUSH command further up the OBCP 150 (6) and revert back to the idle state 410 (7).

When the stage 100 is in the OB NEG state 430, the stage 100 may respond to received commands in a variety of ways. For example, if the controller 121 receives a PULL command on the out-bound communication pathway 150 (i.e., OBCMD="PULL" (33)), the controller 121 may pass the PULL command further up the OBCP 150 (34) and return to the OB NEG 430 state (35). If the controller 121 receives a PULL command on the in-bound communication pathway 160 (i.e., IBCMD="PULL" (36)), the controller 121 may pass the PULL command further down the IBCP 160 (37) and return to the OB NEG 430 state (38). If the controller 121 receives, on either the IBCP 160 or OBCP 150, a PUSH command (47), the controller 121 may revert back to the idle state 410. In the absence of a command, if the controller 121 determines that the cell 110 is filling (i.e., the cell 110 should not be charged above a predetermined limit to prevent damage to the cell 110) (56), the cell controller 121 may pass a locally generated PULL command further up the OBCP 150 (12) and revert back to the idle state 410 (13).

When the stage 100 is in the IB POS state 440, the stage 100 may respond to received commands in a variety of ways. For example, if the controller 121 receives a PUSH command on the out-bound communication pathway 150 (i.e., OBCMD="PUSH" (39)), the controller 121 may pass the PUSH command further up the OBCP 150 (40) and remain in the IB POS 440 state (41). If the controller 121 receives a PUSH command on the in-bound communication pathway 160 (i.e., IBCMD="PUSH" (42)), the controller 121 may pass the PUSH command further down the IBCP 160 (43) and remain in the IB POS 440 state (44). If the controller 121 receives, on either the IBCP 160 or OBCP 150, a PULL command (46), the controller 121 may revert back to the idle state 410. In the absence of a command if the controller 121 determines that the cell 110 is filling (i.e., the cell 110 should not be charged above a predetermined limit to prevent damage to the cell 110) (45), the cell controller 121 may pass a locally generated PUSH command further down the IBCP 160 (18) and revert back to the idle state 410 (19).

When the stage 100 is in the IB NEG state 450, the stage 100 may respond to received commands in a variety of ways. For example, if the controller 121 receives a PULL command on the out-bound communication pathway 150 (i.e., OBCMD="PULL" (48)), the controller 121 may pass the PULL command further up the OBCP 150 (49) and return to the IB NEG 450 state (50). If the controller 121 receives a PULL command on the in-bound communication pathway 160 (i.e., IBCMD="PULL" (51)), the controller 121 may pass the PULL command further down the IBCP 160 (52) and remain in the IB NEG 450 state (53). If the controller 121 receives, on either the IBCP 160 or OBCP 150, a PUSH command (55), the controller 121 may revert back to the idle state 410. In the absence of a command, if the controller 121 determines that the cell 110 is filling (i.e., the cell 110 should not be charged above a predetermined limit to prevent damage to the cell 110) (54), the cell controller 121 may pass a locally generated PULL command further down the IBCP 160 (22) and revert back to the idle state 410 (23).

Figure 5:
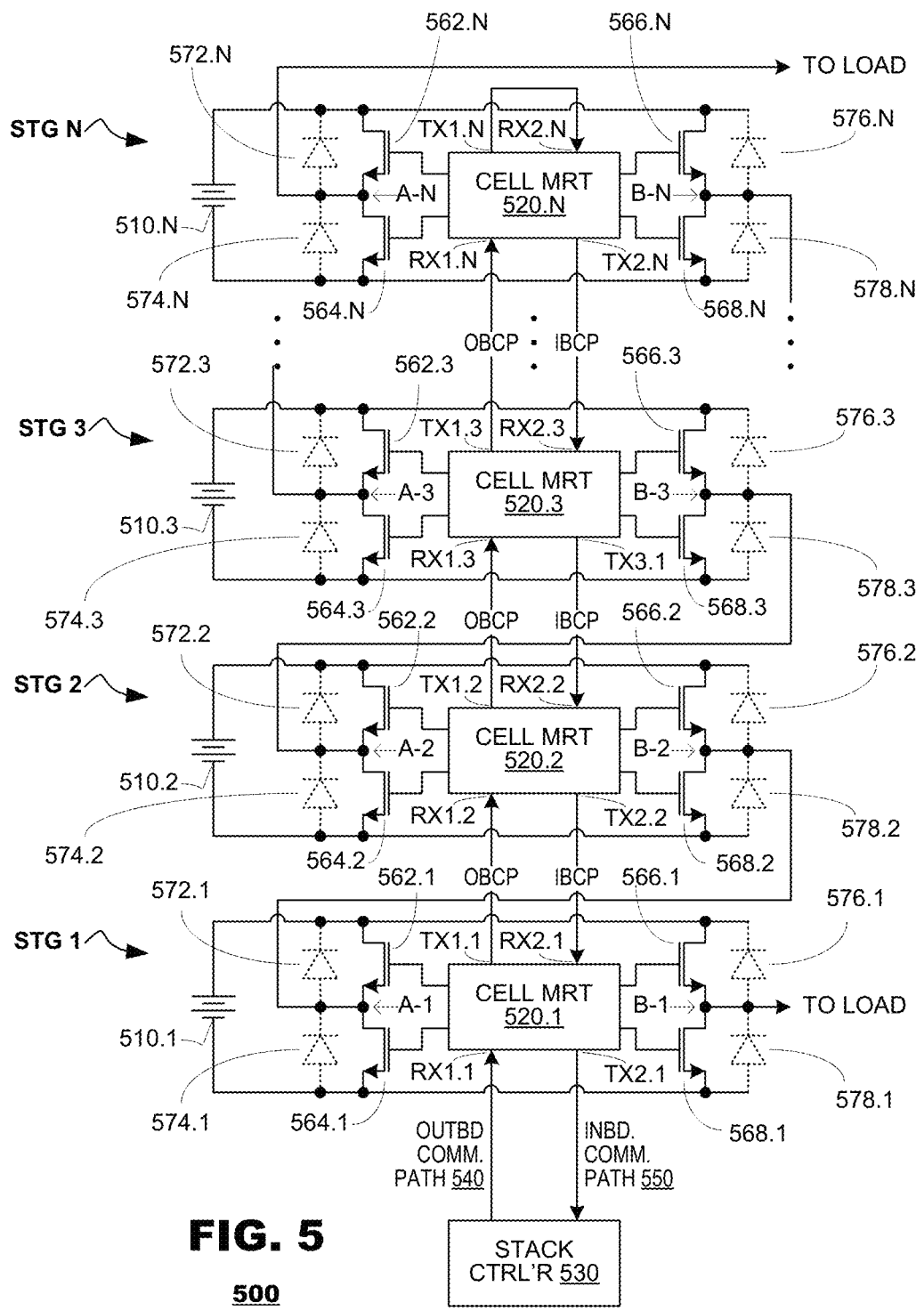
FIG. 5 is a diagram of a battery stack according to an embodiment of the present disclosure.

FIG. 5 illustrates a battery stack 500 according to an embodiment of the present disclosure. The battery stack 500 may include multiple stages 1-N and a stack controller 530. The stages 1-N may be similar to the stage 100 described above with respect to FIG. 1. The stack controller 530 may control the operation of the stages 1-N of the battery stack 500 via a communication network including outbound and inbound communication paths 540 and 550, respectively (described in further detail below).

Adjacent stages may be coupled to each other as described hereinbelow, forming the battery stack 500. Each stage 1-N may include terminals RX1, RX2, TX1, TX2 (shown in more detail in FIG. 1). The terminals TX1 and TX2 for each stage may be coupled to the terminals RX1 and RX2 of an adjacent stage on both the outbound path 540 and inbound path 550. Take stage 2 for example. The terminal RX1.2 of stage 2 may be coupled to the terminal TX1.1 of stage 1 via the outbound path 540. The terminal TX1.2 of stage 2 may be coupled to the terminal RX1.3 of stage 3 via the outbound path 540. The terminal RX2.2 of stage 2 may be coupled to the terminal TX3.1 of stage 3 via the inbound path 550. The terminal TX2.2 may be coupled to the terminal RX2.1 of stage 1 via the inbound path 550. The terminals RX1, RX2, TX1, TX2 of the remaining stages 1 and 3-N may be coupled to adjacent stages in a similar fashion. Moreover, the terminals RX1.1 and TX2.1 of stage 1 may be coupled to the stack controller 530 via the outbound and inbound paths 540 and 550.

Each stage 1-N may also include output terminals (or nodes) A and B (similar to nodes A and B of FIG. 1 described above). The output nodes A and B for each stage 1-N may be coupled to adjacent stages in the battery stack in a daisy chain configuration, as shown in FIG. 5. Take stage 2 for example. The output terminal A-2 of stage 2 may be coupled to the output terminal B-3 of stage 3 and the output terminal B-2 of stage 2 may be coupled to the output terminal A-1 of stage 1. Moreover, the output terminal B-1 of stage 1 (or the bottom stage) and the output terminal A-N of stage N (or the top stage) may be coupled to a load (e.g., a motor).

Each stage 1-N may be substantially similar to the cell controller system 100 of FIG. 1 in structure and operation. Each stage may include a battery cell 510.1-510.N and cell monitor (MTR) 520.1-520.N pair and switches (562.1-568.1 for stage 1, 562.2-568.2 for stage 2, 562.3-568.3 . . . and 562.N-568.N for stage N). The battery cells 510.1-510.N and the cell MTRs 520.1-520.N are substantially similar, in structure and operation, to the battery cell 110 and cell monitor 120, respectively, of FIG. 1. Cell monitors of adjacent cells may communicate with each other using the terminals TX1, TX2, RX1, RX2 via the outbound and inbound communication pathways 540 and 550, respectively. Additionally, the four switches for each stage may be substantially similar, in structure and operation, to the switches 132, 134, 136, and 138 of FIG. 1.

The stack controller 530 may be coupled to the cell controller 520.1 of stage 1. The stack controller 530 may send PUSH or PULL commands to cell MRT 520.1 of stage 1 on the outbound communication pathway 540 based on the requirements of the load (described in further detail below). The stack controller 530 may receive a clock (CLK) signal and send timed PUSH/PULL commands up the battery stack 500. The stack controller 530 may also receive communications from the cell MRT 520.1 on the inbound communication pathway 550 (i.e., PUSH/PULL commands that make it back to the stack controller 530).

During operation, the stack controller 530 may control the stack 500 by switching-in or bypassing certain cells 510.1-510.N to supply a desired voltage waveform to the load by sending a calculated number of PUSH/PULL commands (based on the desired voltage waveform) to the cell MTR 520.1 of stage 1 via the outbound communication pathway 540. More specifically, the stack controller 530 may control the stack 500 to generate the desired voltage waveform by determining the voltage required by the load and using the CLK signal to send a series of timed PUSH/PULL commands to the stack 500. The cell MTR 520.1 of stage 1 may decide whether it should be in a "switched-in" or "bypassed" state, as described above with respect to FIGS. 1-4.

In other words, stage 1 would either switch-in the cell 510.1 (i.e., comply with the PUSH/PULL command) or bypass the cell 510.1 and transmit the PUSH/PULL command to the next cell MTR 520.2 (of the next stage 2) in the battery stack 500 via the outbound communication pathway 540. As described with respect to state diagrams of FIG. 2-4 above, the remaining cell MTRs 520.2-520.N of each corresponding stage 2-N may make its own decision on whether to switch-in or bypass (and transmit the command up pathway 540) the corresponding cells 510.2-510.N until there are no more PUSH/PULL commands in the pathway 540 (indicating that the desired voltage waveform is being supplied). In some circumstances, the PUSH/PULL commands may be rejected by each stage 1-N in the stack and the commands may return back down to each stage N-1 on the return communication pathway 550 for reconsideration.

For example, say that the battery stack 500 includes fifty cells 510.1-510.50 and each cell 510.1-510.50 may be capable of supplying 4 V (when healthy). If the motor (or the load) requires+100 V during a given acceleration operation, the stack controller 530 may transmit twenty-five sequential PUSH commands to the cell controller 520.1 of stage 1 via the outbound communication pathway 540. The commands may propagate up the path 540 until twenty-five cells decide to "switch-in" to supply approximately 100 V to the load. The stack controller 530 may similarly transmit twenty-five sequential PULL commands to control the battery stack 500 to provide −100V to the motor.

According one embodiment, the stack controller 530 may control the battery stack 500 to supply a constant voltage waveform (e.g., to power an electric motor) by transmitting a series of PUSH (or PULL) commands up the outbound communication pathway 540. The stack 500 may eventually supply a desired constant waveform (either positive or negative) after an adequate number of cells are switched-in. The stack controller 530 may increase the constant voltage supplied by the stack 500 by sending more PUSH (or PULL if a negative voltage is required) commands up the upstream communication pathway 540. Similarly, the stack controller 530 may decrease the constant voltage supplied by the stack 500 during operation by sending a series of PULL (or PUSH) commands up the outbound communication pathway 540.

According to another embodiment, the stack controller 530 may control the battery stack 500 to supply a sinusoidal voltage waveform. In such an embodiment, the stack controller 530 may send a plurality of alternating sets of PUSH/PULL commands in the following repeating sequence so the output voltage waveform may oscillate: (1) a series PUSH commands (to switch-in cells to provide a positive voltage), (2) a series of PULL commands (to bypass the cells that were switched-in to provide a positive voltage in (1)), (3) a series of PULL commands (to switch-in cells to provide a negative voltage), and (4) a series of PUSH commands (to bypass the cells that were switched-in to provide a negative voltage in (3)). The stack controller 530 may also control the stack 500 to supply various other output waveforms as desired by the load the stack 500 is driving.

The battery stack 500 may also include diodes 572.1-578.1 (for stage 1), 572.2-578.2 (for stage 2), 572.3-578.3 . . . and 572.N-578.N (for stage N), which may be optionally coupled to the switches in each stage 1-N. The diodes may provide charge and discharge fly-back protection for corresponding battery cells 510.1-510.N in each stage 1-N, respectively.

Figure 6:
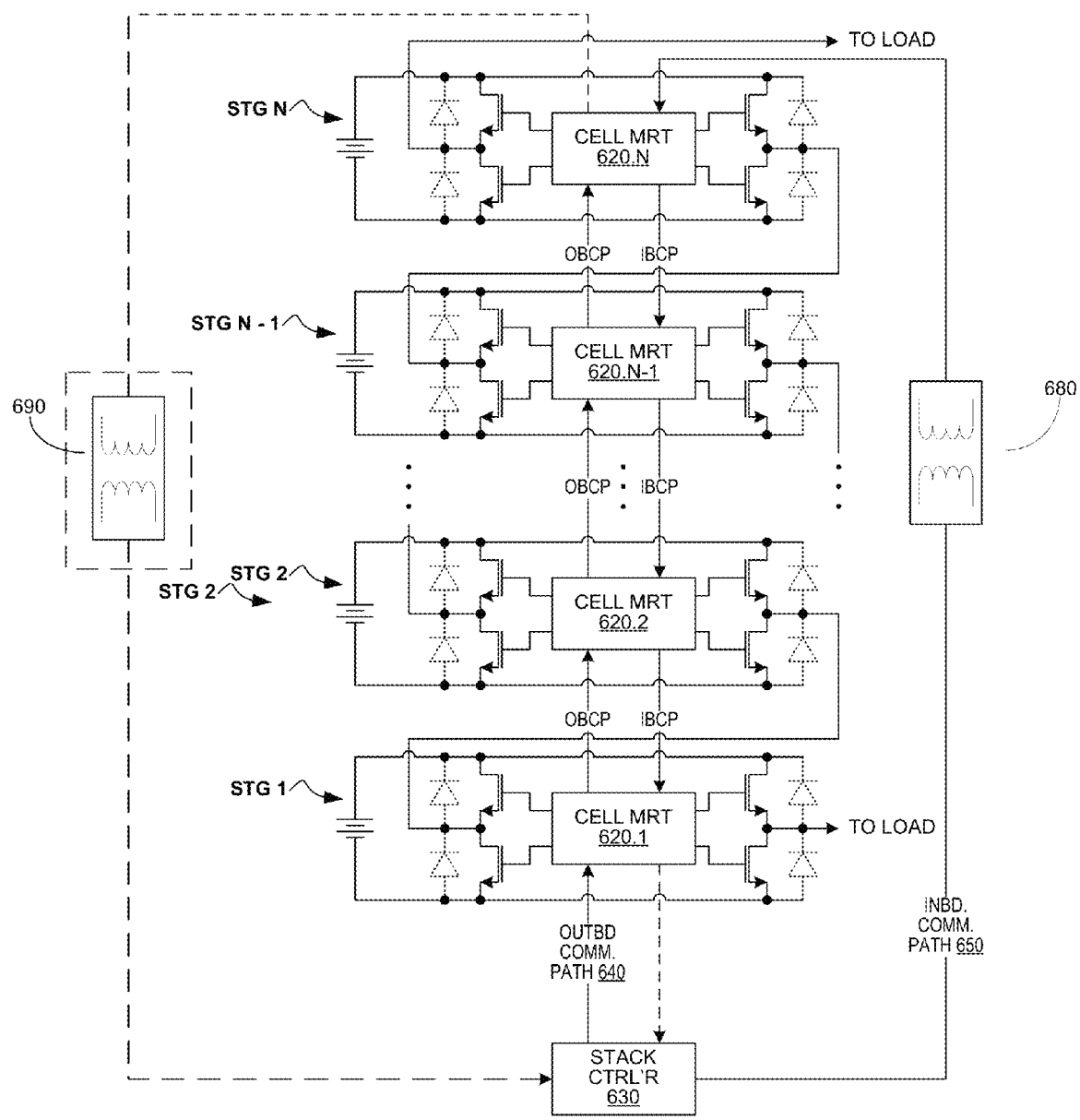
FIG. 6 is a diagram of a battery stack with a transformer according to an embodiment of the present disclosure.

FIG. 6 illustrates a battery stack 600 according to an alternate embodiment of the present invention. Battery stack 600 may include a stack controller 630 and a plurality of stages 1-N which may be similar in structure and operation to the stack controller 530 and stages 1-N of FIG. 5. However, the battery stack 600 of FIG. 6 may also include an isolator 680. The isolator may be any device suitable to maintain an electric isolation between the stack controller 630 and the stage N, for example a transformer, an optical isolator, a capacitive isolator, or the like.

The isolator 680 may be coupled between the stack controller 630 and the last stage N in the battery stack 600. The transformer 680 may allow the stack controller 630 to directly communicate with the stage N cell MTR 620.N without damaging the stack controller 630. The stack controller 630 may not otherwise be able to directly communicate with the last stage N because doing so would expose the stack controller 630 to the high voltages present on stage N of the stack 600 (the high voltages may damage the stack controller 630).

The battery stack 600 may optionally include another transformer 690 coupled between the last stage N and the stack controller 630. The transformer 690 may allow the stack controller 630 to directly communicate with the stage N cell MRT 620.N without damaging the stack controller 630. The stack controller 630 may not otherwise be able to directly receive communicate with the last stage N because doing so would expose the stack controller 630 to the high voltages present on stage N of the stack 600 (the high voltages may damage the stack controller 630).

Figure 7:
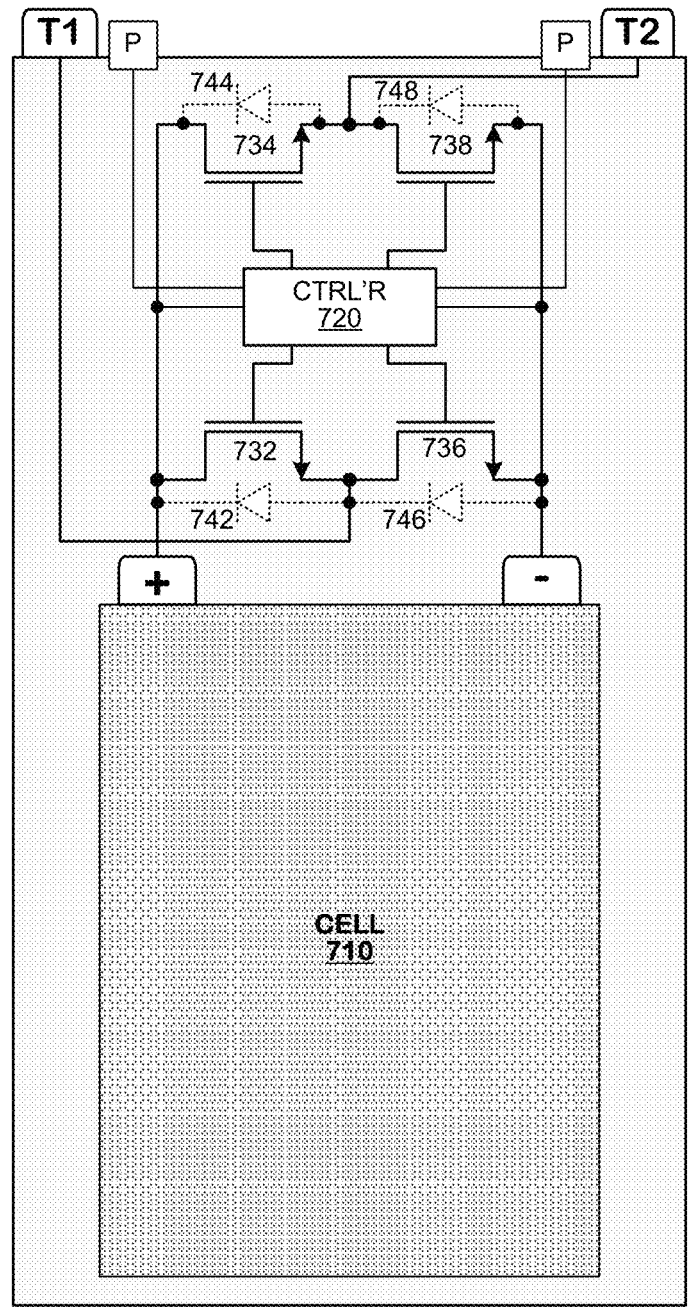
FIG. 7 is a diagram of a battery pack for a battery cell with an integrated controller according to an embodiment of the present disclosure.

FIG. 7 illustrates a battery pack 700 including a battery cell 710 with an integrated controller 720 for fault protection. The battery pack 700 may include a battery cell 710, a local controller 720, MOSFET transistors 732, 734, 736, and 738, output terminals T1 and T2, and power terminals "P." The gate terminals of the transistors 732-738 may be coupled to the controller 720 in an H-Bridge configuration, as illustrated in FIG. 7. The drain terminals of the transistors 732 and 734 may be coupled a positive terminal ("+") of the battery cell 710 and the source terminals of transistors 732 and 734 may be coupled to the output terminals T1 and T2, respectively. The source terminals of the transistors 736 and 738 may be coupled a negative terminal ("−") of the battery cell 710 and the drain terminals of transistors 736 and 738 may be coupled to the output terminals T1 and T2, respectively. The controller 720 may also be coupled the + and − terminals of the cell 710 and the power terminals P.

The cell 710 may be a lead-acid, nickel-metal hydride (NiMH), lithium-ion (Li-ion), or other type of battery that may be integrated in a battery stack to provide power to drive hybrid vehicles. The cell 710 may include a positive terminal "+" and a negative terminal "−" which may be selectively coupled to terminals T1 and T2. The terminals T1 and T2 may be coupled to terminals of adjacent battery packs in a stack of batteries used to drive a load (similar to the battery stack of FIG. 5).

The controller 720 (which may be similar to controller 121 of FIG. 1 or controller 520 in FIG. 5) may include a microcontroller, a programmable processor, and/or a state machine and may measure the condition of the cell 710 (via terminals + and −) as well as the current flowing between T1 to T2 to determine the presence of a fault. The controller 720 may be coupled to power terminals P, which may provide a communication channel allowing the controller 720 to communicate (send PUSH/PULL) command to adjacent cells in the battery stack (in a similar manner as described above with respect to FIGS. 1-6). The controller 720 may be internally powered by the cell 710.

Transistors 732-738 may be MOSFETS of sufficient size to serve as power transistors or mechanical switches. Transistors 732 and 738 may be depletion mode MOSFETs (i.e., current flows through them when they are off) and transistors 734 and 736 may be enhancement mode MOSFETs (i.e., current flows through them when they are on).

During regular operation (i.e., the controller 720 is not activating the switches 732-738), the "+" terminal of cell 710 may be coupled to T1 and the "−" terminal of cell 710 may be coupled to T2. Thus, even if the controller malfunctions or breaks, the battery cell 710 may still be coupled to terminals T1 and T2, so the cell 710 is not bypassed in the battery stack.

If the controller 720 determines that there is a large current flowing between T1 to T2 (i.e., a fault condition), the controller 720 may determine that the cell 710 may be in danger of being damaged. In such cases, the controller 720 may switch depletion mode MOSFETs 732 and 738 on so they are not conducting current and leave enhancement mode MOSFETs 734 and 736 off so they are not conducting current. This operation effectively isolates the battery cell 710 from the high current flowing between the terminals T1 and T2 so that the cell 710 remains undamaged. This type of "fault protection" may be useful when the cells of a battery stack are subject to catastrophic events such as submersion. Moreover, the battery pack 700 may be a water-tight enclosure to prevent water from entering into the package and damaging the cell 710 and the controller 720. The controller 720 may also monitor (using a sensor similar to the sensor shown in FIG. 1) the temperature inside the battery pack 700. If the temperature is too high (above a predefined limit), this may also indicate a fault condition, and the controller 720 may disconnect the battery cell 710 from the terminals T1 and T2 as described above.

The battery pack 700 may be integrated in a battery stack similar to the battery stacks described in FIGS. 5 and 6 above. In such systems, each battery cell and controller pair (or "stage") may be provided in a common battery package 700 as shown in FIG. 7. Each stage may operate in a similar fashion to the stages described above in FIGS. 1-5 and may communicate with neighboring stages over a communication network (as shown in FIGS. 4 and 5) as described above.

The battery pack 700 may also include diodes 742, 744, 746, and 748, which may be coupled to a source and drain terminal of corresponding transistors 732, 734, 736, and 738. The diodes 742, 744, 746, and 748 may be optionally included to provide charge and discharge fly-back protection for the transistors 732, 734, 736, and 738.

Figure 8:
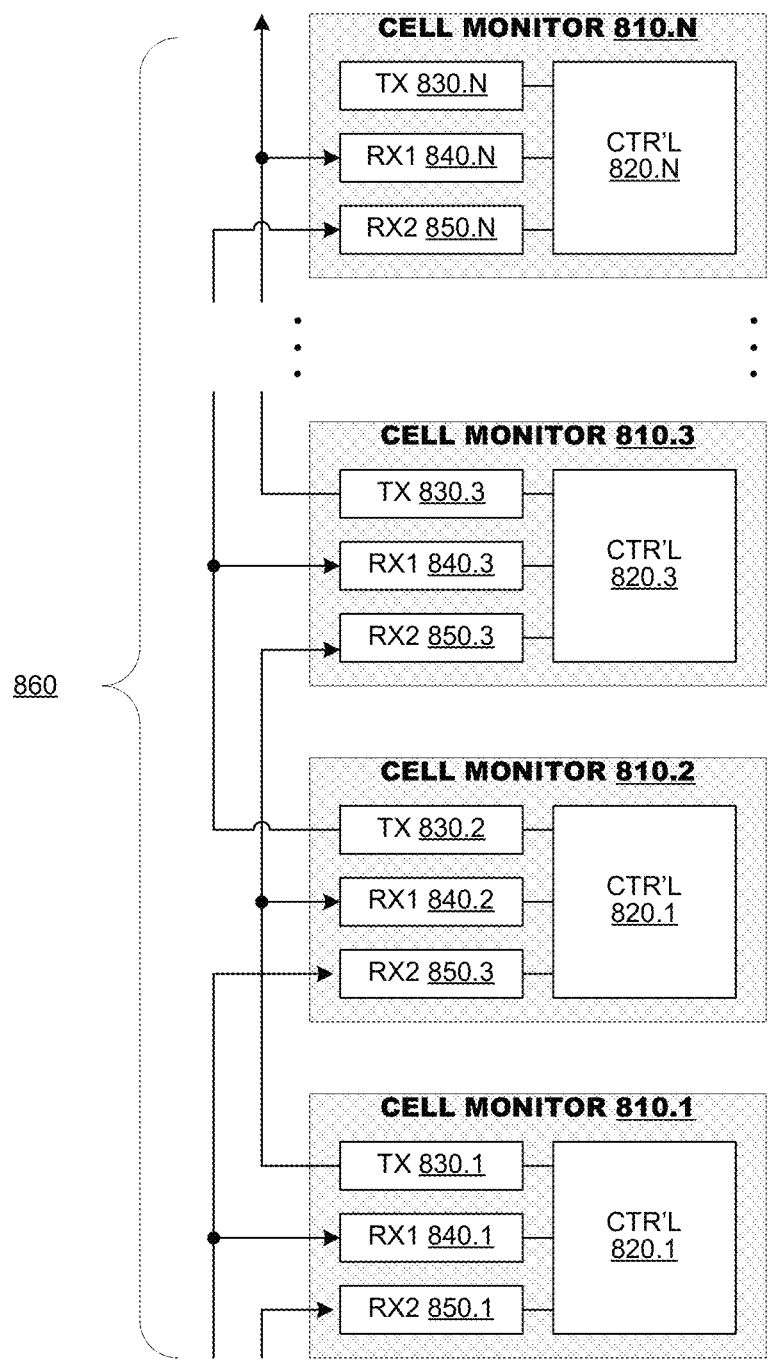
FIG. 8 is a diagram of a cell controller communication network implementing a leapfrogging protocol according to an embodiment of the present disclosure.

FIG. 8 is a simplified block diagram of a cell controller communication network 800 implementing a leapfrogging protocol according to an embodiment of the present disclosure. The diagram in FIG. 8 omits the battery cells and switches in FIGS. 1, 5, and 6, for simplification purposes, and focuses on a communication network 800 between the cell controllers in a plurality of stages of a battery stack. The communication network 800 may include a plurality of cell monitors 810.1-810.N which may be connected in a "leapfrogging" configuration 860. In a leapfrogging configuration, each cell monitor 810.1, 810.2, 810.3 . . . -810.N may be coupled to the closest two neighboring cell monitors succeeding it in the network 800 and the closest two neighboring cell monitors preceding it in the network 800.

Each cell monitor, say monitor 810.1, may include a local controller 820.1, a local transmitter 830.1, a first local receiver 840.1, and a second local receiver 850.1. Each local controller 820.1 may be coupled to a respective local transmitter 830.1, a first local receiver 840.1, and a second local receiver 850.1. Each first local receiver 840.1 may be coupled to a transmitter of an immediately preceding cell controller in the network 800. Each second local receiver 850.1 may "leapfrog" the immediately preceding cell monitor and may be coupled to a transmitter of a cell controller that is two nodes down the network 800.

Take cell monitor 810.3 for example. The first local receiver 840.3 may be coupled to the transmitter 830.2 in cell monitor 810.2. The second local receiver 850.3 may be coupled to the transmitter 830.1 in cell monitor 810.1.

The operation of each cell monitor 810.1-810.N in the communication network 800 will now be described using cell monitor 810.3 as an example. During normal operation, the first local receiver 840.3 may receive PUSH/PULL commands from the transmitter 830.2 in cell monitor 810.2. The controller 820.3 may process the received PUSH/PULL command and determine whether to PUSH/PULL a corresponding battery cell or transmit, using the local transmitter 830.3, the received PUSH/PULL command to the next cell monitor 810.4 in the network 800 (this process is described in more detail above with respect to FIGS. 1-6).

In some cases, however, there may be a fault in the communication network 800. The cell controller 820.3 of cell monitor 810.3 may "eavesdrop" on the transmitter 830.1 of the cell monitor 810.1. If cell monitor 810.1 transmits, via transmitter 830.1, two commands (either PUSH or PULL) to cell monitor 810.2 and the transmitter 830.2 never passes a command (either PUSH or PULL) to cell monitor 810.3, the cell controller 820.3 of cell monitor 810.3 may determine that there is a fault in cell monitor 810.2. If there is a fault detected in this manner, the controller 820.3 may "leapfrog" (or bypass) the cell monitor 810.2 in the network 800 and respond to PUSH/PULL commands from the cell monitor 810.1 henceforth.

Each cell monitor 810.1-810.N in the network 800 may follow the leapfrogging protocol described above to prevent a fault in any one of the cell monitor 810.1, 810.2, 810.3 . . . -810.N from disabling the entire communication network 800.

According to another embodiment of the present invention, the controller 820.3 of cell monitor 810.3 may determine that it has not received a PUSH/PULL command from the preceding cell controller 810.2 in the network 800 for a predetermined period of time. The absence of PUSH/PULL commands received from the preceding cell monitor 810.2 may indicate that cell controller 810.2 is faulty. In such cases, the cell controller 820.3 may determine whether the second local receiver 850.3 has received a PUSH/PULL command from the transmitter 830.1 in the cell monitor 810.1 that is two nodes down the communication network 800 during the same period of time.

If the transmitter 830.1 in the cell monitor 810.1 has not transmitted any PUSH/PULL command during the same period of time, the controller 820.3 may determine that there is nothing wrong with cell monitor 810.2 and that there are simply no PUSH/PULL commands in the network 800. If, however, the transmitter 830.1 has transmitted PUSH/PULL commands during the same period of time, the controller 820.3 may determine that cell monitor 810.2 is faulty. If cell the monitor 810.2 is faulty, the controller 820.3 may "leapfrog" (or bypass) the cell monitor 810.2 in the network 800 and respond to PUSH/PULL commands from the cell monitor 810.1 henceforth.

Although the foregoing techniques have been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. Those skilled in the art will appreciate that these techniques may be implemented in other ways without departing from the spirit and substantive features of the invention. The present embodiments are therefore to be considered in all respects as illustrative and not restrictive.

We claim:

1. A battery pack comprising:
a first battery cell stage comprising:
a first pair of output terminals;
a first battery cell;
a first set of switches comprising two pairs of switches coupling the first battery cell to the first pair of output terminals in an H-bridge configuration; and
a first local controller programmed to control the first set of switches to selectively connect and disconnect the first battery cell to the first pair of output terminals, wherein the first battery cell, the first set of switches, and the first local controller are provided in a common package; and
a second battery cell stage comprising:
a second pair of output terminals, wherein a first output terminal of the second pair of output terminals is electrically coupled to a first output terminal of the first pair of output terminals;
a second battery cell;
a second set of switches comprising two pairs of switches coupling the second battery cell the second pair of output terminals in an H-bridge configuration; and
a second local controller programmed to control the second set of switches to selectively connect and disconnect the second battery cell to the second pair of output terminals.

2. The battery pack of claim 1, wherein the package is a water-tight enclosure.

3. The battery pack of claim 1, wherein the first local controller is programmed to cause the switches to disconnect the first battery cell from the output terminals upon detection of an operating fault at the first battery cell.

4. The battery pack of claim 3, wherein the fault is an excess amount of current flow through the output terminals.

5. The battery pack of claim 3, wherein the fault is an excess amount of heat detected in the package.

6. The battery pack of claim 3, wherein the fault is a depleted level of charge of the first battery cell.

7. The battery pack of claim 3, wherein the fault is an absence of communication signals received by the controller from outside the package.

8. The battery pack of claim 1, wherein:
a first pair of switches of the two pairs of switches of the first set of switches are depletion mode transistors that conduct current in an off state and do not conduct current in an on state; and
a second pair of switches of the two pairs of switches of the first set of switches are enhancement mode transistors that conduct current in an on state and do not conduct current in an off state.

9. The battery pack of claim 1, wherein:
during an active state, either the first pair of switches of the two pairs of switches of the first set of switches conduct current and a second pair of switches of the two pairs of switches of the first set of switches do not conduct current or the first pair of switches do not conduct current and the second pair of switches conduct current;
during a bypass state, only one switch in each of the pairs of switches of the first set of switches conducts current; and
during a fault state, at least three of the switches in the pairs of switches of the first set of switches do not conduct current.

10. The battery pack of claim 9, wherein the two pairs of switches of the first set of switches comprise transistors are metal-oxide-semiconductor-field-effect transistors (MOSFETs).

11. The battery pack of claim 9, further comprising a diode coupled between two terminals of each transistor.

12. The battery pack of claim 1, wherein the first local controller is programmed to transmit commands signals outside the package.

13. The battery pack of claim 1, further comprising a sensor to measure the amount of current flowing between the output terminals.

14. The battery pack of claim 1, wherein the first output terminal of the second pair of output terminals is electrically coupled to a first terminal of a first switch of the second set of switches, and wherein a second terminal of the first switch of the second set of switches is electrically coupled to the first output terminal of the first pair of output terminals.

15. A system comprising:
a plurality of battery packs coupled to each other, the plurality of battery packs comprising:
a first battery pack, comprising:
a first battery cell;
a first pair of output terminals;
a first set of switches comprising two pairs of switches coupling the first battery cell to the first pair of output terminals in an H-bridge configuration; and
a first local controller to control the first set of switches to selectively connect and disconnect the first battery cell to the first pair of output terminals; and
a second battery pack, comprising:
a second batter cell;
a second pair of output terminals, wherein a first output terminal of the second pair of output terminals is electrically coupled to a first output terminal of the first pair of output terminals;
a second set of switches comprising two pairs of switches coupling the second battery cell to the second pair of output terminals in an H-bridge configuration; and
a second local controller to control the second set of switches to selectively connect and disconnect the second battery cell to the second pair of output terminals; and
a communication system coupled to the first local controller and the second local controller to allow communication between the battery packs,
wherein at least the first battery cell, the first set of switches, and the first local controller are provided in a common package.

16. The system of claim 15, wherein the package is a water-tight enclosure.

17. The system of claim 15, wherein the first local controller causes the first set of switches to disconnect the first battery cell from the first pair of output terminals upon detection of an operating fault.

18. The system of claim 17, wherein the fault is an excess amount of current flow through the output terminals.

19. The system of claim 17, wherein the fault is an excess amount of heat detected in the package.

20. The system of claim 17, wherein the fault is a depleted level of charge of the battery cell.

21. The system of claim 17, wherein the fault is an absence of communication signals received by the controller from outside the package.

22. The system of claim 15, wherein:
a first pair of switches of the two pairs of switches of the first set of switches are depletion mode transistors that conduct current in an off state and do not conduct current in an on state; and
a second pair of switches of the two pairs of switches are enhancement mode transistors that conduct current in an on state and do not conduct current in an off state.

23. The system of claim 22, wherein the transistors are metal-oxide-semiconductor-field-effect transistors (MOSFETs).

24. The system of claim 22, further comprising a diode coupled between two terminals of each transistor.

25. The system of claim 15, wherein the local controller transmits command signals outside the battery pack via the communication system.

26. The system of claim 15, wherein the communication system is bidirectional.

27. The system of claim 15, wherein the communication system is bidirectional.

28. The system of claim 15, further comprising a sensor to measure an amount of current flowing between the output terminals.

29. The system of claim 15, wherein the local controller receives and transmits command signals to neighboring battery packs.

30. The system of claim 29, wherein the local controller disconnects the battery cell from the output terminals based on received command signals.

31. The system of claim 29, wherein the local controller connects the battery cell from the output terminals based on received command signals.

32. The system of claim 15, wherein the first output terminal of the second pair of output terminals is electrically coupled to a first terminal of a first switch of the second set of switches, and wherein a second terminal of the first switch of the second set of switches is electrically coupled to the first output terminal of the first pair of output terminals.

* * * * *